US011275707B2

(12) United States Patent
Xiang et al.

(10) Patent No.: US 11,275,707 B2
(45) Date of Patent: Mar. 15, 2022

(54) MULTI-CORE PROCESSOR AND INTER-CORE DATA FORWARDING METHOD

(71) Applicant: Alibaba Group Holding Limited, Grand Cafyman (KY)

(72) Inventors: Xiaoyan Xiang, Shanghai (CN); Taotao Zhu, Hangzhou (CN); Feng Zhu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/013,305

(22) Filed: Sep. 4, 2020

(65) Prior Publication Data

US 2021/0089487 A1    Mar. 25, 2021

(30) Foreign Application Priority Data

Sep. 25, 2019    (CN) .......................... 201910913361.8

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 7,808,996 | B2 * | 10/2010 | Chung | H04L 61/6031 370/392 |
| 8,473,658 | B2 * | 6/2013 | Sanzone | G06F 13/1605 710/112 |
| 10,062,429 | B1 * | 8/2018 | Borole | G06F 12/0868 |
| 2014/0013060 | A1 | 1/2014 | Frey et al. | |
| 2016/0098279 | A1 * | 4/2016 | Glew | G06F 9/3851 712/239 |
| 2018/0293205 | A1 * | 10/2018 | Koker | G06N 3/0445 |
| 2018/0349136 | A1 * | 12/2018 | Guthrie | G06F 9/52 |
| 2020/0349075 | A1 * | 11/2020 | McGee | G06F 12/0815 |

* cited by examiner

*Primary Examiner* — Michael Sun

(57) ABSTRACT

The present invention discloses a multi-core processor and an inter-core data forwarding method. The multi-core processor includes a plurality of processor cores and a multi-core interconnection bus. The multi-core interconnection bus includes: a plurality of request processing interfaces, each of which is adapted to receive a read data request sent by a coupled processor core, and send the read data request to a request storage unit; and the request storage unit, adapted to receive the read data request sent by the request processing interface, and forward the read data request to another request processing interface, where the request processing interface receives a read data request forwarded by the request storage unit, sends the read data request to the coupled processor core, receives a request result that is returned by the processor core by reading a cache of the processor core, and sends the request result to a request processing interface coupled to a processor core that initiates the request; and receives a request result sent by the another request processing interface, determines valid data based on the received request result, and sends the valid data to the coupled processor core.

18 Claims, 4 Drawing Sheets

MULTI-CORE PROCESSOR AND INTER-CORE DATA FORWARDING METHOD

CROSS-REFERENCE TO RELATED APPLICATIONS

This application claims priority to Chinese Patent Application No. 201910913361.8 filed Sep. 25, 2019, which is incorporated herein in its entirety.

TECHNICAL FIELD

The present invention relates to the processor field, and in particular, to a multi-core processor and an inter-core data forwarding method.

BACKGROUND OF THE INVENTION

A multi-core processor includes a multi-core interconnection bus and a plurality of processor cores. When a processor core processes a memory access instruction, if the memory access instruction indicates a memory read operation, the processor core first accesses a local cache; and if requested data exists in the cache, the processor core returns valid data information and the requested data (referred to as valid data); or if no requested data exists in the cache, the processor core returns data miss information, and sends a read data request to the multi-core interconnection bus.

When a local cache data miss occurs, each processor core may send a read data request to the multi-core interconnection bus under a constraint of a data consistency protocol, to obtain data of a shared attribute address from another processor core of a same shared region. In an existing implementation, the multi-core interconnection bus first stores the read data request in a request storage unit, and then the request storage unit forwards the read data request to other processor cores of the shared region. The other processor cores search for data corresponding to the address, in respective caches. If found, the data corresponding to the address is returned to the request storage unit of the a multi-core interconnection bus. After receiving the data, the request storage unit returns the data to the processor core that initiates the request.

The disadvantages of the existing inter-core data forwarding implementation solution are as follows: (1) Data returned by another processor core needs to be first stored in the request storage unit of the multi-core interconnection bus, and then the request storage unit returns the data to the processor core that initiates the request. It takes a long time to complete this. In particular, the multi-core processor is generally a complex processor, and an operating frequency of a clock is high. Therefore, the process always lasts for a plurality of clock cycles. (2) In addition, because the request storage unit needs to maintain reception of requests from the plurality of processor cores and return a response operation, transmission congestion may occur, and the requested data is not definitely returned from the request storage unit immediately to the processor core that initiates the request. Therefore, a solution to accelerating inter-core data forwarding is required.

SUMMARY OF THE INVENTION

In view of the foregoing problems, the present invention provides a multi-core processor and an inter-core data forwarding method to overcome the foregoing problems or partly solve the foregoing problems.

According to one aspect of the present invention, a multi-core processor is provided and includes a plurality of processor cores and a multi-core interconnection bus, where the multi-core interconnection bus includes: a plurality of request processing interfaces, where each request processing interface is coupled to a different processor core in the plurality of processor cores, and adapted to receive a read data request sent by the coupled processor core, and send the read data request to a request storage unit; and the request storage unit, adapted to receive the read data request sent by the request processing interface, and forward the read data request to another request processing interface, where the request processing interface is further adapted to: receive a read data request forwarded by the request storage unit, send the read data request to the coupled processor core, receive a request result that is returned by the processor core by reading a cache of the processor core, and send the request result to a request processing interface coupled to a processor core that initiates the request; and receive a request result sent by the another request processing interface, determine valid data based on the received request result, and send the valid data to the coupled processor core.

Optionally, in the multi-core processor according to the present invention, the request processing interface is further adapted to send the request result returned by the coupled processor core to the request storage unit; and when no valid data exists in request results sent by all the request processing interfaces, the request storage unit is further adapted to send the read data request to a memory coupled to the request storage unit, receive a request result returned by the memory, and send the request result to the request processing interface coupled to the processor core that initiates the request.

Optionally, in the multi-core processor according to the present invention, the request processing interface is further adapted to: if the valid data exists in the request result sent by the another request processing interface, send the valid data to the coupled processor core; or if no valid data exists in request results sent by all other request processing interfaces, send valid data in the request result sent by the request storage unit, to the coupled processor core.

Optionally, in the multi-core processor according to the present invention, the request processing interface is further adapted to discard other received request results after sending the valid data to the coupled processor core.

Optionally, in the multi-core processor according to the present invention, when receiving the read data request sent by the request processing interface, the request storage unit further determines whether a request address is a shared address, and if yes, forwards the read data request to the another request processing interface, or else, sends the read data request to the memory coupled to the request storage unit.

Optionally, the multi-core processor according to the present invention further includes a snoop filter coupled to the request storage unit, where when receiving the read data request sent by the request processing interface, the request storage unit further accesses the snoop filter, to determine a processor core having valid data and forward the read data request to a request processing interface coupled to the processor core having valid data.

Optionally, in the multi-core processor according to the present invention, the processor core includes: a memory access processing unit, adapted to process a memory access instruction, and if data needs to be read from outside the core, instruct a bus requesting unit to send the read data request to the multi-core interconnection bus; the bus requesting unit, adapted to send the read data request to the multi-core interconnection bus; a forwarding processing unit, adapted to receive the read data request forwarded by the multi-core interconnection bus, and send the read data request to a cache read/write unit; and the cache read/write unit, adapted to access the cache when receiving the read data request, and return the request result to the forwarding processing unit, where the forwarding processing unit is further adapted to send the request result to the multi-core interconnection bus; and the bus requesting unit, is further adapted to receive the valid data sent by the multi-core interconnection bus, and send the valid data to the memory access processing unit.

Optionally, in the multi-core processor according to the present invention, the request processing interface includes: a request processing unit, adapted to receive the read data request sent by the coupled processor core, and send the read data request to the request storage unit; a request forwarding unit, adapted to send the read data request forwarded by the request storage unit, to the coupled processor core, and send the request result returned by the processor core, to a result arbitration unit of another request processing interface; and a result arbitration unit, adapted to receive the request result sent by the another request processing interface, determine the valid data based on the received request result, and send the valid data to the request processing unit, where the request processing unit is further adapted to send the received valid data to the coupled processor core.

Optionally, in the multi-core processor according to the present invention, when receiving the request result returned by the memory, the request storage unit sends the request result to a result arbitration unit of the request processing interface coupled to the processor core that initiates the request; and the result arbitration unit is further adapted to: if the valid data exists in the request result sent by the another request processing interface, send the valid data to the request processing unit; or if no valid data exists in the request results sent by all the other request processing interfaces, send valid data in the request result sent by the request storage unit, to the request processing unit.

Optionally, in the multi-core processor according to the present invention, the result arbitration unit is further adapted to discard the other received request results after sending the valid data to the request processing unit.

According to another aspect of the present invention, an inter-core data forwarding method for a multi-core processor is provided, where the multi-core processor includes a plurality of processor cores and a multi-core interconnection bus, the multi-core interconnection bus includes a request storage unit and a plurality of request processing interfaces, each request processing interface is coupled to a different processor core in the plurality of processor cores, and the method includes: sending, by a first processor core in the plurality of processor cores, a read data request to a coupled first request processing interface; sending, by the first request processing interface, the read data request to the request storage unit, and forwarding, by the request storage unit, the read data request to another request processing interface; sending, by the another request processing interface, the read data request to a coupled processor core, receiving a request result that is returned by the processor core by reading a cache of the processor core, and sending the request result to the first request processing interface; and determining, by the first request processing interface, valid data based on the received request result, and sending the valid data to the first processor core.

Optionally, the method according to the present invention further includes: sending, by the another request processing interface, the request result to the request storage unit; and when no valid data exists in request results sent by all the request processing interfaces, sending, by the request storage unit, the read data request to a memory coupled to the request storage unit, receiving a request result returned by the memory, and sending the request result to the first request processing interface.

Optionally, the method according to the present invention further includes: the step of determining, by the first request processing interface, valid data based on the received request result, and sending the valid data to the first processor core includes: if the valid data exists in the request result sent by the another request processing interface, sending the valid data to the first processor core; or if no valid data exists in request results sent by all other request processing interfaces, sending valid data in the request result sent by the request storage unit, to the first processor core.

Optionally, the method according to the present invention further includes: after sending the valid data to the first processor core, discarding, by the first request processing interface, other received request results.

Optionally, the method according to the present invention further includes: when receiving the read data request sent by the request processing interface, further determining, by the request storage unit, whether a request address is a shared address, and if yes, forwarding the read data request to the another request processing interface, or else, sending the read data request to the memory coupled to the request storage unit.

Optionally, the method according to the present invention further includes: when receiving the read data request sent by the request processing interface, further accessing, by the request storage unit, a snoop filter, to determine a processor core having valid data and forward the read data request to a request processing interface coupled to the processor core having valid data.

According to still another aspect of the present invention, a system-on-chip is fluffier provided and includes the foregoing multi-core processor.

According to still another aspect of the present invention, an intelligent device is further provided and includes the foregoing system-on-chip.

In the solution according to the present invention, the request result corresponding to the read data request and returned from inter-core communication may be directly sent to the processor core that initiates the request, without being stored and returned by the request storage unit. This can reduce a transmission delay, and increase an inter-core forwarding speed of data.

The foregoing descriptions are merely brief descriptions about the technical solution of the present invention. To help understand the technical means of the present invention more clearly and implement the technical means according to content of this specification, and make the foregoing and other objectives, features, and advantages of the present invention more comprehensible, the following describes specific implementations of the present invention in detail.

BRIEF DESCRIPTION OF THE DRAWINGS

By reading detailed descriptions of the following preferred implementations, persons of ordinary skill in the art cart clearly know various other advantages and benefits. The drawings are used for showing the preferred implementations only, and shall not be construed as a limitation on the present invention. In addition, in all the drawings, same reference signs represent same components. In the drawings.

DETAILED DESCRIPTION OF THE INVENTION

The following describes exemplary embodiments of the present disclosure in more detail with reference to the accompanying drawings. Although the exemplary embodiments of the present disclosure are displayed in the accompanying drawings, it should be understood that the present disclosure may be implemented in various forms and should not be limited by the embodiments described herein. On the contrary, the embodiments are provided for more thorough understanding of the present disclosure, and can completely convey the scope of the present disclosure to those skilled in the art.

Figure 1:
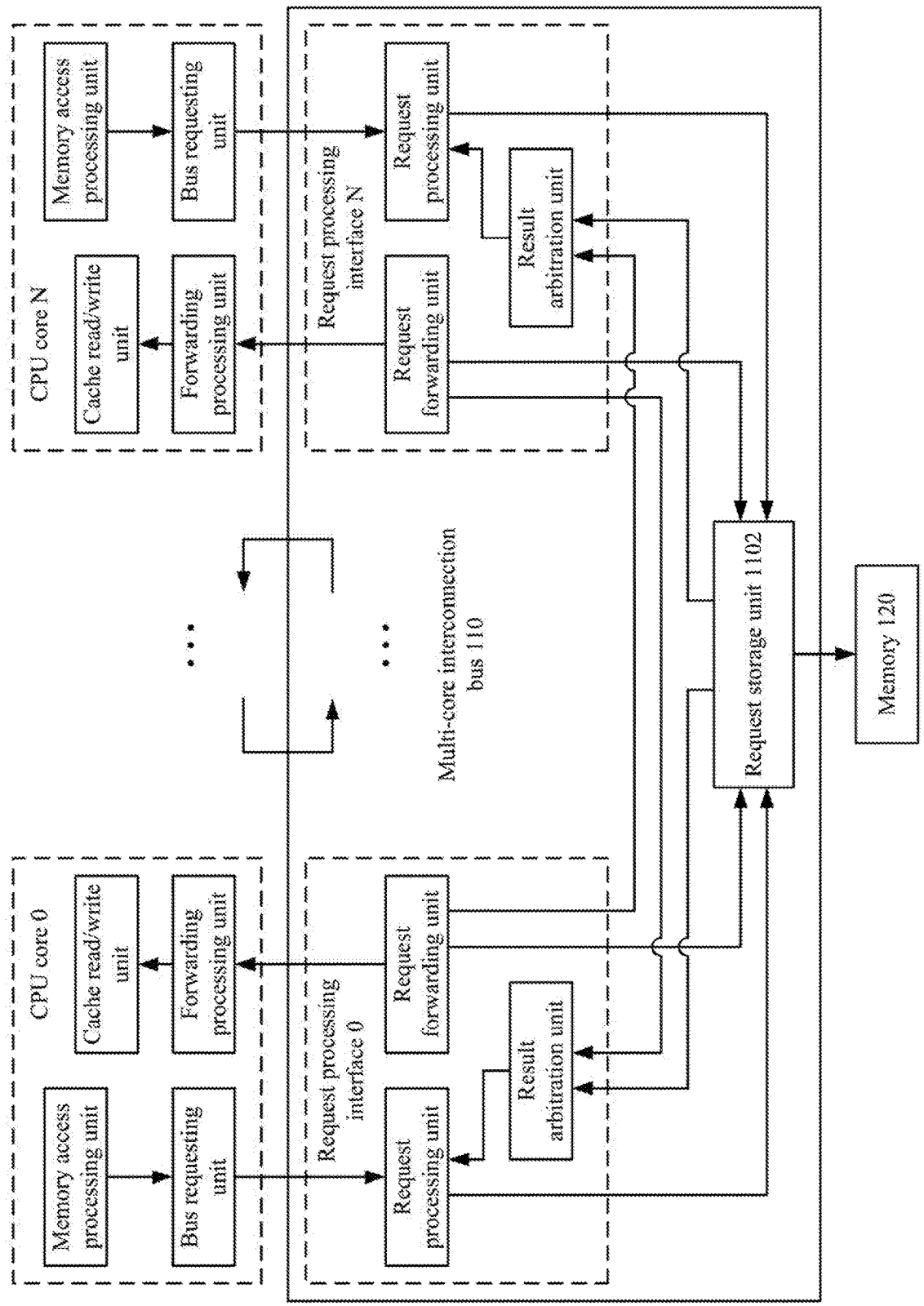
FIG. 1 illustrates a schematic structural diagram of a multi-core processor 100 according to an embodiment of the present invention.

FIG. 1 illustrates a schematic structural diagram of a multi-core processor 100 according to an embodiment of the present invention. As shown in FIG. 1, the multi-core processor 100 includes a plurality of processor cores (CPU core 0 to CPU core N) and a multi-core interconnection bus 110, where the plurality of processor cores perform inter-core communication by using the multi-core interconnection bus 110. The multi-core interconnection bus 110 is further coupled to a memory 120, where the memory 120 stores data, and the memory 120 is, for example, a lower-level cache unit (for example, L2) or a memory (for example, a DDR). When, the memory 120 is a lower-level cache unit, the lower-level cache unit may be disposed in the multi-core processor 100 or outside the multi-core processor 100. Each processor core may include a memory access processing unit, a bus requesting unit, a forwarding processing unit, and a cache read/write unit.

The memory access processing unit is adapted to: process a memory access instruction; if the memory access instruction indicates a memory read operation, first access a local cache of the processor core; and if requested data exists in the cache, return valid data information and the requested data (referred to as valid data); or if no requested data exists in the cache, return data miss information. When a data miss occurs, data needs to be read from outside the core. In this case, the memory access processing unit initiates a read data request to the multi-core interconnection bus. Specifically, the memory access processing unit may instruct the bus requesting unit to send the read data request to the multi-core interconnection bus 110.

The bus requesting unit is adapted to accept control from the memory access processing unit, and send the read data request to the multi-core interconnection bus 110. In addition, the bus requesting unit is further adapted to receive valid data that is returned from the multi-core interconnection bus 110 for a request address, and send the valid data to the memory access processing unit. The valid data for a request address is data temporarily stored by another processor core, or is data temporarily stored by the memory 120.

The forwarding processing unit is adapted to receive a read data request forwarded by the multi-core interconnection bus 110, and send the read data request to the cache read/write unit. Herein the read data request forwarded by the multi-core interconnection bus 110 is sent by another processor core to the multi-core interconnection bus 110. When the cache read/write unit returns a request result, the forwarding request receiving unit is further adapted to send the request result to the multi-core interconnection bus 110.

The cache read/write unit is adapted to accept control from the forwarding request receiving unit, access the local cache after receiving the read data request sent by the forwarding processing unit, and perform a data read operation. If no requested data exists in the cache, data miss information is returned; or if requested data exists in the cache, valid data information and the requested data are returned.

The multi-core interconnection bus 110 includes a plurality of request processing interfaces (request processing interface 0 to request processing interface N) and a request storage unit 1102, where each request processing interface is coupled to a different processor core of the plurality of request processing interfaces. For example, the request processing interface 0 is coupled to the CPU core 0, and the request processing interface N is coupled to the CPU core N. Each request processor interface is adapted to receive a read data request sent by the processor core coupled to the processor interface, and send the read data request to the request storage unit 1102. The request storage unit 1102 is adapted to receive and store the read data request sent b the request processing interface, and forward the read data request to another request processing interface.

When receiving a read data request forwarded by the request storage unit, the request processing interface sends the read data request to the processor core coupled to the request processing interface, receive a request result that is returned by the processor core by reading a cache of the processor core, and send the request result to a request processing interface coupled to a processor core that initiates the request.

When receiving a request result sent by another request processing interface, the request processing interface determines valid data based on the received request result, and sends the valid data to the coupled processor core.

In some embodiments, each request processing interface may not only send the request result returned by the processor core coupled to the processor interface, to the request processing interface coupled to the processor core that initiates the request, but also send the request result to the request storage unit 1102. Correspondingly, the request storage unit 1102 is further adapted to determine, for a stored read data request, whether valid data exists in a corresponding request result. When no valid data exists in request results sent by all the request processing interfaces, the request storage unit 1102 sends the read data request to the memory 120 coupled to the request storage unit, receives a request result returned by the memory 120, and then sends the request result to a request processing interface coupled to a processor core that initiates the request.

In some embodiments, when receiving the read data request sent by the request processing interface, the request storage unit 1102 may not only forward the read data request to another request processing interface, but also directly send the read data request to the memory 120 coupled to the request storage unit, and send the request result returned by the memory 120, to the request processing interface coupled to the processor core that initiates the request.

Therefore, the request processing interface coupled to the processor core that initiates the request may receive a plurality of request results, that is, request results sent by a plurality of other processor cores and the request result sent by the request storage unit 1102, and the request processing interface further needs to perform arbitration on the plurality of request results. It may be understood that, if valid data exists in any one of the other processor cores, the data is definitely latest data based on a multi-core data consistency mechanism. Therefore, an arbitration logic of a result arbitration unit is: if valid data exists in request results sent by other request processing interfaces, valid data in any request result is sent to the coupled processor core; or if no valid data exists in request results sent by all other request processing interfaces, valid data in the request result sent by the request storage unit 1102 is sent to the coupled processor core.

It should be noted that, because valid data obtained by the request storage unit 1102 from the memory 120 may be earlier than valid data obtained by other processor cores from caches, in this embodiment of the present invention, when the request processing interface performs arbitration on a plurality of request results, even if the valid data sent by the request storage unit 1102 arrives earlier, valid data sent by another request processing interface is used preferentially. In addition, after sending the valid data to the coupled processor core, the request processing interface farther discards other received request results.

In some embodiments, when receiving the read data request sent by the request processing interface, the request storage unit 1102 does not definitely forward the read data request to another request processing interface. The request storage unit 1102 first determines whether a request address is a shared address, and if yes, forwards the read data request to another request processing interface, or else, sends the read data request to the memory 120 coupled to the request storage unit.

Herein the shared address is additionally described. In the multi-core processor, each processor core has a memory management unit (MMU) and a translation look-aside buffer (TLB), where the TLB records a mapping relationship between a virtual address and a physical address, and records each attribute of an address, where one attribute is whether the address is shared. A shared address attribute indicates that an address operated by the CPU core 0 may also be operated by the CPU cores 1 to N, and a non-shared address attribute indicates that an address operated by the CPU core 0 may not be operated by the CPU cores 1 to N. Correspondingly, if an address has a shared attribute, in the multi-core processor, each processor core in a same shared region may access a same piece of data. Therefore, data consistency needs to be maintained. Data consistency may be ensured by mechanisms of the multi-core processor. The mechanisms may be obtained from related prior arts. Specific used mechanisms are not limited in this embodiment of the present invention.

In some embodiments, the multi-core interconnection bus 110 is further coupled to a snoop litter (Snoop filter). If data needs to be obtained from another processor core in a same shared region, a snoop filter (Snoop filter) may be first accessed, to determine whether valid data is temporarily stored in a snooped processor core. If no valid data is temporarily stored, the read data request does not need to be forwarded to the processor core, so that transmission load of the multi-core interconnection bus 110 is reduced. Specifically, when receiving the read data request sent by the request processing interface, the request storage unit 1102 further accesses the snoop filter, to determine a processor core having valid data, and forwards the read data request to a request processing interface coupled to the processor core having valid data, without forwarding the data request to a request processing interface coupled to a processor core not having valid data.

In some embodiments, each request processing interface may include a request processing unit, a request forwarding unit, and a result arbitration unit.

The request processing unit is adapted to receive the read data request sent by the coupled processor core, and send the read data request to the request storage unit 1102. When receiving valid data sent by the result arbitration unit, the request processing unit further sends the valid data to the coupled processor core.

The request forwarding unit is adapted to send the read data request forwarded by the request storage unit 1102, to the coupled processor core, and send the request result returned by the processor core, to a result arbitration unit of another request processing interface.

The result arbitration unit is adapted to receive the request result sent by another request processing interface, determine the valid data based on the received request result, and send the valid data to the request processing unit.

In addition, if the request storage unit 1102 sends the read data request to the memory 120, when receiving the request result returned by the memory 120, the request storage unit 1102 further sends the request result to the result arbitration unit of the request processing interface coupled to the processor core that initiates the request.

Correspondingly, the result arbitration unit further performs arbitration on a plurality of request results. Specifically, if the valid data exists in the request result sent by another request processing interface, the valid data is sent to the request processing unit; or if no valid data exists in request results sent by all other request processing interfaces, the valid data in the request result sent by the request storage unit 1102 is sent to the request processing unit. In addition, after sending the valid data to the request processing unit, the result arbitration unit further discards other received request results.

In some embodiments, a register may be further disposed in the multi-core interconnection bus 110, where the register stores a switch bit representing whether an acceleration mechanism is enabled. When receiving the request result returned by the coupled processor core, the request processing interface first obtains a value of the switch bit from the register, and when the switch bit indicates that the current acceleration mechanism is enabled, sends the request result to the request processing interface coupled to the processor core that initiates the request; or when the switch bit indicates that the current acceleration mechanism is disabled, the request processing interface does not send the request result to the request processing interface coupled to the processor core that initiates the request, hut sends the request result only to the request storage unit 1102.

In some embodiments, the register may be disposed in each request processing interface, and acceleration mechanisms of some processor cores are disabled, but acceleration mechanisms of other processor cores are enabled. Therefore, data request results of some processor cores are forwarded by the request storage unit (that is, processed based on a mode in the prior art), but data request results of other processor cores may be directly transmitted between request processing interfaces.

Figure 2:
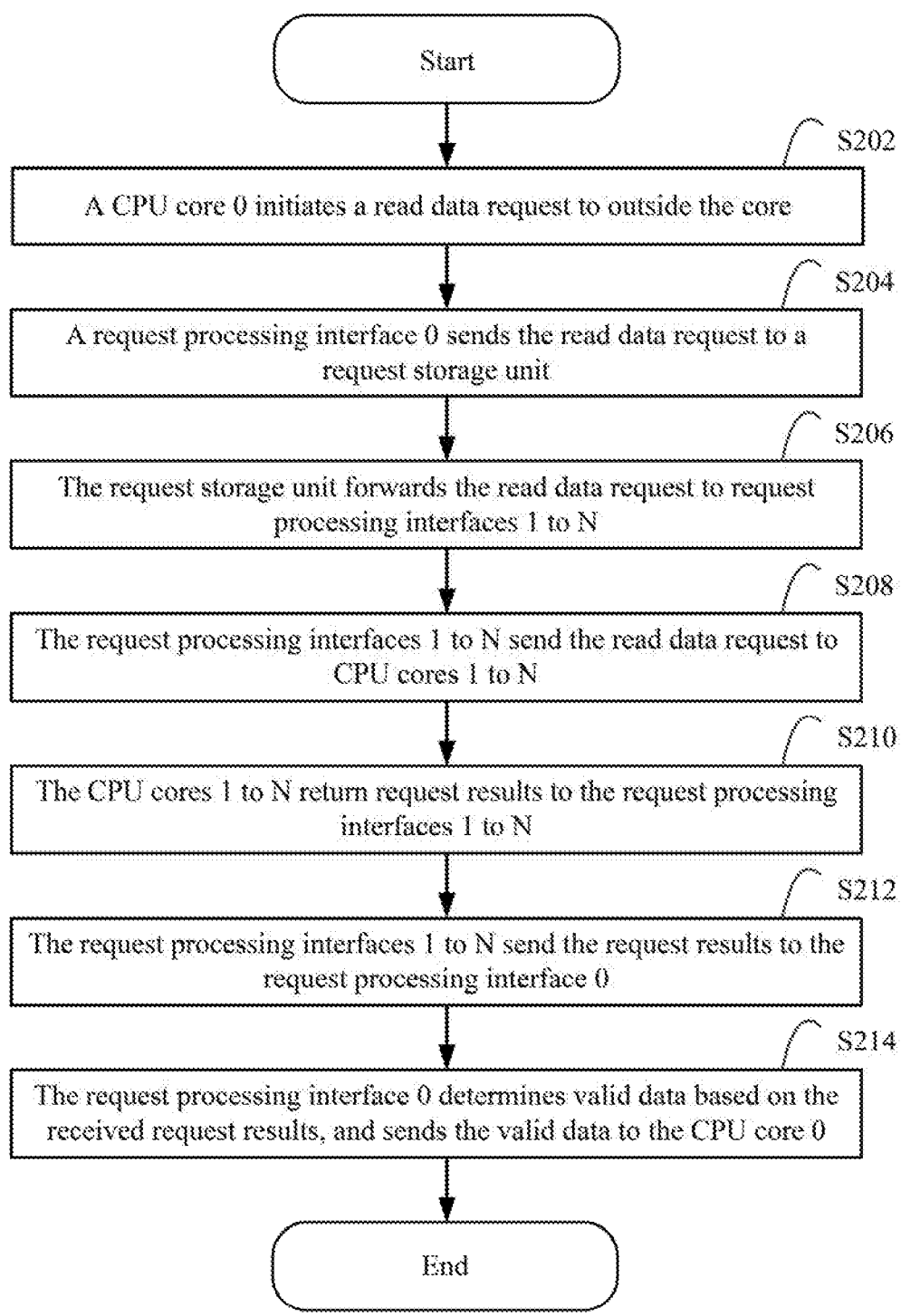
FIG. 2 illustrates a flowchart of a method 200 for inter-core data forwarding according to an embodiment of the present invention.

FIG. 2 illustrates a flowchart of a method 200 fear inter-core data forwarding according to an embodiment of the present invention. The method 200 is suitable for execution in the foregoing multi-core-processor. Referring to FIG. 2, the method 200 starts from step S202. In step S202, one processor core (for example, a CPU core 0) in a plurality of processor cores initiates a read data request to outside the core, and sends the read data request to a request processing interface (for example, a request processing interface 0) coupled to the processor core. Specifically, when the CPU core 0 processes a memory access instruction, if the memory access instruction indicates a memory read operation, the CPU core 0 first accesses a local cache of the CPU core 0, and if there is no requested data in the cache, initiates a read data request to outside the core.

In step S204, when receiving the read data request sent by the CPU core 0, the request processing interface 0 sends the read data request to a request storage unit 1102.

In step S206, when receiving the read data request sent by the request processing interface 0, the request storage unit 1102 stores the read data request, and may forward the read data request to request processing interface 1 through request processing interface N.

In some embodiments, the request storage unit 1102 may interpret a request address of the read data request, and if an address attribute of the request address is a shared attribute, and forward the read data request to request processing interfaces corresponding to all other CPU cores in a same shared region, for example, the request processing interface 1 through request processing interface N; or if an address attribute of the request address is a non-shared attribute, send the read data request to a memory 120 coupled to the request storage unit 1102, receive a request result returned by the memory 120, and send the request result to the request processing interface 0.

In some embodiments, when receiving the read data request sent by the request processing interface 0, the request storage unit 1102 further accesses a snoop filter, to determine a processor core having valid data and forwards the read data request to a request processing interface coupled to the processor core having valid data.

In some embodiments, when receiving the read data request sent by the request processing interface 0, the request storage unit 1102 may not only forward the read data request to another request processing interface, but also directly send the read data request to the memory 120 coupled to the request storage unit 1102, receive the request result returned by the memory 120, and send the request result to the request processing interface 0.

In step S208, when receiving the read data request forwarded by the request storage unit 1102, the request processing interface 1 to the request processing interface N send the read data request to the CPU core 1 to the CPU core N.

In step S210, when receiving the read data request sent by the request processing interface 1 to the request processing interface N, the CPU core 1 to the CPU core N access respective caches, perform data read operations, and return request results to the request processing interface 1 to the request processing interface N. If no requested data exists in the caches, data miss information is returned; or if requested data exists in the caches, valid data information and the requested data are returned.

In step S212, when receiving the request results sent by the processor core 1 to the processor core N, the request processing interface 1 to the request processing interface N send the request results to the request processing interface 0.

In some embodiments, the request processing interface 1 to the request processing interface N further send the request results to the request storage unit 1102. Correspondingly, the request storage unit 1102 determines all the request results; and if no valid data exists in all the request results, sends the read data request to the memory 120 coupled to the request storage unit 1102, receives the request result returned by the memory 120, and sends the request result to the request processing interface 0.

In step S214, the request processing interface 0 determines valid data based on the received request results, and sends the valid data to the CPU core 0. Specifically, if valid data exists in the request results sent by the request processing interface 1 to the request processing interface N, the request processing interface 0 sends the valid data to the processor core 0; or if no valid data exists in all the request results sent by the request processing interface 1 to the request processing interface N, the request processing interface 0 sends valid data in the request result sent by the request storage unit 1102, to the CPU core 0. After sending the valid data to the CPU core 0, the request processing interface 0 further discards other received request results.

As described above, in an existing inter-core data forwarding solution, data returned by a CPU core 1 to a CPU core N needs to be first stored in a request storage unit of a multi-core interconnection bus, and then the request storage unit returns the data to a processor core 0. A data transmission path is long, and a long path delay is caused.

In addition, when receiving read data requests of a plurality of CPU cores, the request storage unit needs to perform arbitration on the read data requests based on sources to determine priorities, and perform queuing processing based on the priorities, that is, first process a read data request of a high priority, and after sending response data to a corresponding processor core, process a read data request of a lower priority. Therefore, after response data corresponding to the read data request of the lower priority arrives at the request storage unit, the response data cannot be returned to a corresponding processor core immediately.

In the foregoing embodiment according to the present invention, operation results of reading respective caches, returned by the CPU core 1 to the CPU core N, are directly sent to the request processing interface 0, and then are returned by the request processing interface 0 to the CPU core 0. Because the request results do not pass through the request processing unit, on one hand, a data transmission path is relatively short, and on the other hand, a risk of being unable to immediately return data, which is caused by queuing processing of the request processing unit, is avoided. Therefore, a function of providing the CPU core 0 with inter-core transmission data within a shortest delay is implemented.

Figure 3:
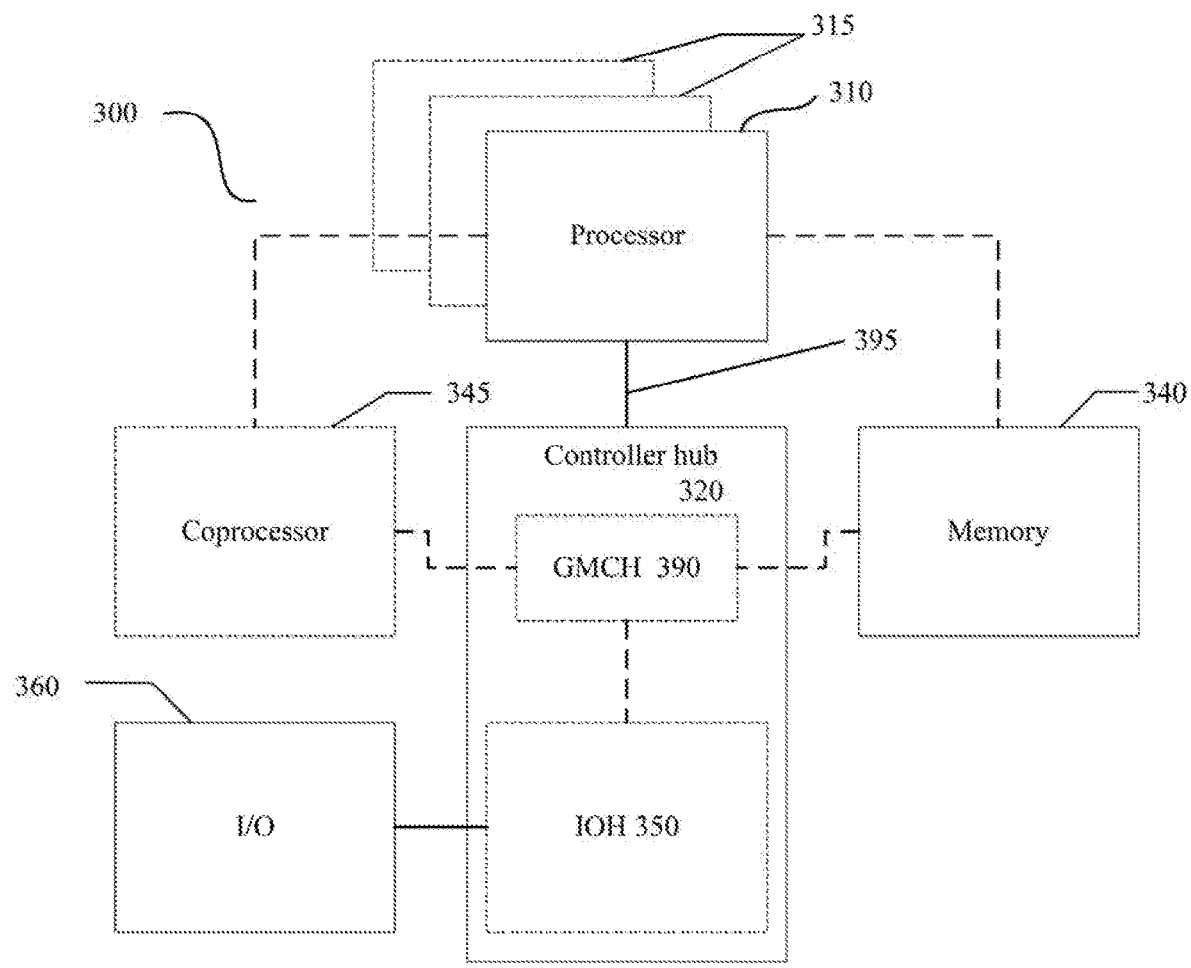
FIG. 3 illustrates a schematic diagram of a computer system 300 according to an embodiment of the present invention.

FIG. 3 illustrates a schematic diagram of a computer system 300 according to an embodiment of the present invention. The computer system 300 shown in FIG. 3 may be applied to laptops, desktop computers, hand-held PCs, personal digital assistants, engineering workstations, servers, network devices, network hubs, switches, embedded processors, digital signal processors (DSP), graphics devices, video game devices, set-top boxes, microcontrollers, cellular phones, portable media players, hand-held devices, and various other electronic devices. The present invention is not limited thereto. All processors and/or other systems executing logics that may be included and disclosed in this specification shall fall within the protection scope of the present invention.

As shown in FIG. 3, the system 300 may include one or more processors 310 and 315. The processors are coupled to a controller hub 320. In an embodiment, the controller hub 320 includes a graphics memory controller hub (GMCH) 390 and an input/output hub (IOH) 350 (which may be on a separate chip). The GMCH 390 includes a memory controller and a graphics controller that are coupled to a memory 340 and a coprocessor 345. The IOU 350 couples an input/output (I/O) device 360 to the GMCH 190. Alternatively, the memory controller and the graphics controller are integrated in a processor. Therefore, the memory 340 and the coprocessor 345 are directly coupled to the processor 310. In this case, the controller hub 320 includes only the IOH 350.

The additional processor 315, optional in nature, is indicated by using a dashed line in FIG. 3. Each processor 310 or 315 may include one or more of the processor cores described in this specification, and may be one version of the multi-core processor 100 shown in FIG. 1.

The memory 340 may be, for example, a dynamic random access memory (DRAM) or a phase change random access memory (PCM) or a combination thereof. For at least one embodiment, the controller hub 320 communicates with the processor 310 or 315 by using a multi-drop bus (multi-drop bus) such as a front side bus (FSB), a point-to-point interface such as a quick path interconnect (QPI) interface, or a similar connection 395.

In an embodiment, the coprocessor 345 is a dedicated processor, such as a high throughput MIC processor, a network or communication processor, a compression engine, a graphics processor, a GPGPU, or an embedded processor. In an embodiment, the controller hub 320 may include an integrated graphics accelerator.

In an embodiment, the processor 310 executes an instruction for controlling a general type of data processing operation. A coprocessor instruction may be embedded in the instruction. The processor 310 identifies, for example, a type of coprocessor instruction that should be executed by the attached coprocessor 345. Therefore, the processor 310 issues the coprocessor instruction (or a control signal that indicates the coprocessor instruction) to the coprocessor 345 over a coprocessor bus or another interconnection. The coprocessor 345 receives and executes the received coprocessor instruction.

Figure 4:
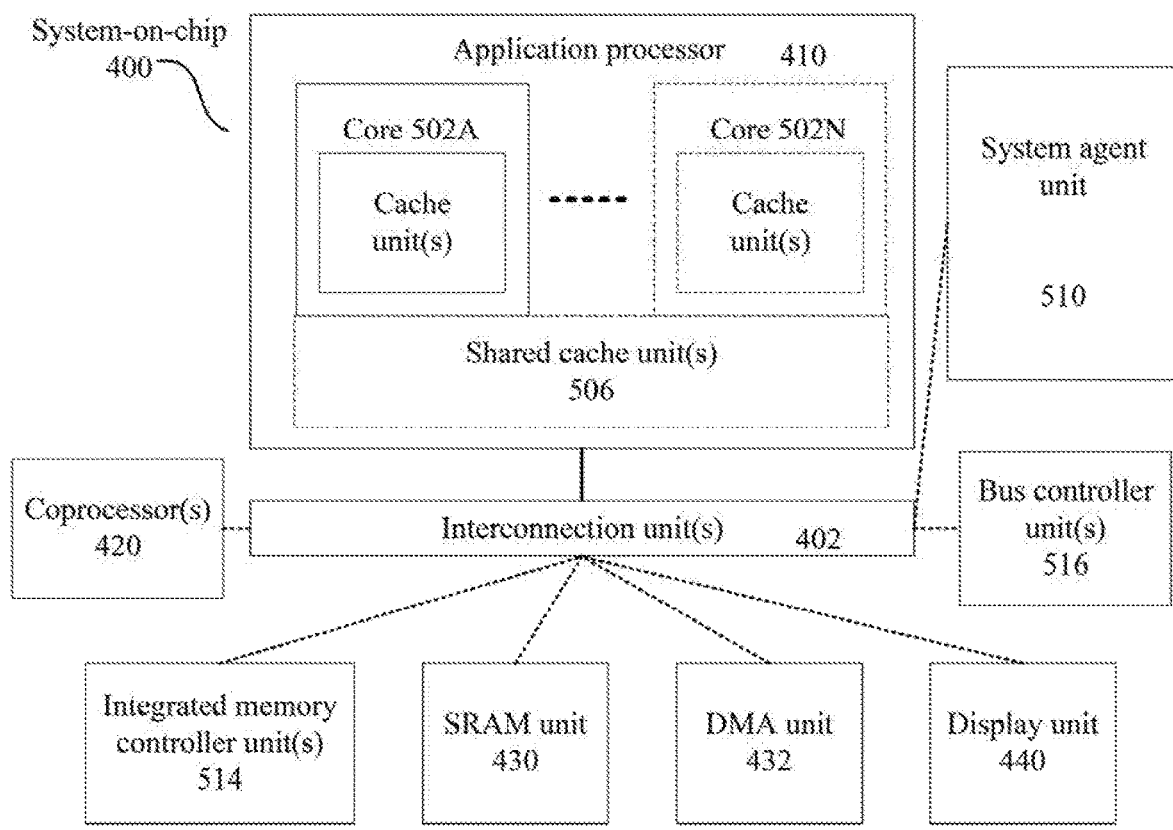
FIG. 4 illustrates a schematic diagram of a system-on-chip (SoC) 400 according to an embodiment of the present invention.

FIG. 4 illustrates a schematic diagram of a system-on-chip (SoC) 400 according to an embodiment of the present invention. An application processor 410 included in the system-on-chip shown in FIG. 4 may be the multi-core processor 100 shown in FIG. 1. As shown in FIG. 4, an interconnection unit 402 is coupled to the application processor 410, a system agent unit 510, a bus controller unit 516, an integrated memory controller unit 514, one or more, coprocessors 420, a static random access memory (SRAM) unit 430, a direct memory access (DMA) unit 432, and a display unit 440 for being coupled to one or more external displays. The application processor 410 includes a set of one or more cores 502 A-N and a shared cache unit 506. The coprocessor 420 includes an integrated graphics logic, an image processor, an audio processor, and a video processor. In an embodiment, the coprocessor 420 includes a dedicated processor, such as a network or communication processor, a compression engine, a GPGPU, a high throughput MIC processor, an embedded processor, or the like.

In addition, the system-on-chip described above may be included in an intelligent device to implement corresponding functions in the intelligent device, including but not limited to executing related control programs, data analysis, computing and processing, network communication, controlling peripherals of the intelligent device, and so on.

Such intelligent devices include dedicated intelligent devices such as mobile terminals and personal digital terminals. The devices include one or more system-on-chips of the present invention to perform data processing or control peripherals of the device.

Such intelligent devices also include dedicated devices designed for specific functions, for example, smart speakers and smart display devices. These devices include the system-on-chip of the present invention to control a speaker or a display device, so as to provide the speaker or the display device with additional functions of communication, perception, data processing, and the like.

Such intelligent devices also include various IoT and AIoT devices. These devices include the system-on-chip of the present invention to perform data processing, for example, AI computing or data communication and transmission, thereby implementing denser and more intelligent device distribution.

Such intelligent devices may also be used in a vehicle, for example, may be implemented as a vehicle-mounted device or may be built into the vehicle, so as to provide a data-processing capability for intelligent driving of the vehicle.

Such intelligent devices may also be used in the home and entertainment field, for example, may be implemented as a smart speaker, a smart air conditioner, a smart refrigerator, a smart display device, or the like. These devices include, the system-on-chip of the present invention to perform data processing and peripheral control, making home and entertainment devices intelligent.

In addition, such intelligent devices may also be used in the industrial field, for example, may be implemented as an industrial control device, a sensing device, an IoT device, an AIoT device, a braking device, or the like. These devices include the system-on-chip of the present invention to perform data processing and peripheral control, making industrial equipment intelligent.

The foregoing description of intelligent devices is merely exemplary, and the intelligent device according to the present invention is not limited thereto. All intelligent devices capable of performing data processing by using the system-on-chip of the present invention fall within the protection scope of the present invention.

All the embodiments of the mechanisms disclosed herein may be implemented in hardware, software, firmware, or a combination thereof. The embodiments of the present invention may be implemented as computer programs or program code executed on a programmable system. The programmable system includes at least one processor, a storage system (including volatile and non-volatile memories and/or storage elements), at least one input device, and at least one output device.

It should be understood that, for the purpose of streamlining the present disclosure and aiding in the understanding of one or more of the inventive aspects, in the foregoing description of the exemplary embodiments of the present invention, various features of the present invention are sometimes grouped together into a single embodiment, diagram, or description thereof. However, the disclosed method is not to be interpreted as reflecting an intention that the claimed invention requires more features than those expressly recited in each claim. Rather, as the following claims reflect, inventive aspects lie in less than all features of a single embodiment disclosed above. Therefore, the claims following the detailed description are hereby expressly incorporated into this detailed description, with each claim standing on its own as a separate embodiment of the present invention.

Those skilled in the art should understand that the modules, units or components of the devices in the examples disclosed herein may be arranged in the devices described in the embodiments, or alternatively located in one or more devices different from the devices in the examples. The modules described in the foregoing examples may be combined into one module or may be divided into a plurality of submodules.

Those skilled in the art can understand that the modules in the devices in the embodiments may be adaptively changed and provided in one or more devices different from the devices in the embodiments. The modules, units or components in the embodiments may be combined into one module, unit or component, and in addition, they may be divided into a plurality of submodules, subunits or subcomponents. All features disclosed in the description (including the accompanying claims, abstract and drawings), and all processes or units of any methods or devices so disclosed, may be combined in any way, except that at least some of such features and/or processes or units are mutually exclusive. Unless otherwise clearly stated, each feature disclosed in the description (including the accompanying claims, abstract and drawings) may be replaced by alternative features serving the same, equivalent or similar purpose.

In addition, those skilled in the art can understand that, although some of the embodiments described herein include some but not other features included in other embodiments, combinations of features of different embodiments are meant to be within the scope of the present invention and form different embodiments. For example, in the following claims, any one of the claimed embodiments may be used in any combination.

In addition, some of the embodiments are described herein as a combination of methods or method elements that can be implemented by a processor of a computer system or by other devices that execute the functions. Therefore, a processor having necessary instructions for implementing the methods or method elements forms a device for implementing the methods or method elements. In addition, the elements described in the device embodiments are examples of devices for implementing functions executed by elements for the purpose of implementing the present invention.

As used herein, unless otherwise specified, the use of ordinals "first", "second", "third", and the like to describe general objects merely represents different instances involving similar objects, and is not intended to imply that objects so described must have a given order in time, space, sorting or any other aspects.

Although the present invention has been described according to a limited quantity of embodiments, benefiting from the foregoing description, those skilled in the art can understand that other embodiments may be conceived of within the scope of the present invention described thereby. In addition, it should be noted that the language used in this specification is mainly selected for readability and teaching purposes, rather than for interpreting or defining the subject of the present invention. Therefore, many modifications and variations made without departing from the scope and spirit of the appended claims are apparent to persons of ordinary skill in the art. In regard to the scope of the present invention, the disclosure of the present invention is descriptive rather than restrictive, and the scope of the present invention should be defined by the appended claims.

What is claimed is:

1. A multi-core processor comprising a plurality of processor cores and a multi-core interconnection bus, wherein the multi-core interconnection bus comprises:
   a plurality of request processing interfaces, wherein each request processing interface is coupled to a different processor core in the plurality of processor cores, and adapted to receive a read data request sent by the coupled processor core, and send the read data request to a request storage unit; and
   the request storage unit, adapted to receive the read data request sent by a request processing interface, and forward the read data request to another request processing interface, wherein
   a given request processing interface is further adapted to:
      receive a first read data request forwarded by the request storage unit, send the first read data request to a given processor core coupled to the given request processing interface, receive a first request result that is returned by the given processor core by reading a cache of the given processor core, and send the first request result to the request storage unit and one of the plurality of request processing interfaces coupled to one of the plurality of processor cores that initiates the first read data request; and
      receive a second request result sent by any other request processing interface, determine valid data based on the received first request result and the received second request result, and send the valid data to the given processor core, wherein when no valid data is determined in the first request result and the second request result, the request storage unit is adapted to send the first read data request to a memory coupled to the request storage unit.

2. The multi-core processor according to claim 1, wherein when no valid data exists in the first request result and the second request result sent by the plurality of request processing interfaces, the request storage unit is further adapted to receive the first request result returned by the memory, and send the first request result to the one of the plurality of request processing interfaces coupled to the one of the plurality of processor cores that initiates the first read data request.

3. The multi-core processor according to claim 1, wherein the given request processing interface is further adapted to:
   when the valid data exists in the second request result sent by the any other request processing interface, send the valid data to the given processor core; and
   when no valid data exists in other second request results sent by other request processing interfaces, send valid data in the first request result sent by the request storage unit, to the given processor core.

4. The multi-core processor according to claim 3, wherein the given request processing interface is further adapted to discard other received second request results after sending the valid data to the given processor core.

5. The multi-core processor according to claim 1, wherein when receiving a second read data request sent by the given request processing interface, the request storage unit is further adapted to:
   determine whether an address of the second read data request is a shared address; and
   in response to a determination that the address of the second read data request is the shared address, forward the second read data request to the another request processing interface; or in response to a determination that the address of the second read data request is not the shared address, send the second read data request to the memory coupled to the request storage unit.

6. The multi-core processor according to claim 1, further comprising a snoop filter coupled to the request storage unit, wherein
when receiving a second read data request sent by the given request processing interface, the request storage unit is further adapted to access the snoop filter, to determine a corresponding processor core having the valid data and forward the second read data request to a corresponding request processing interface coupled to the corresponding processor core having the valid data.

7. The multi-core processor according to claim 1, wherein the given processor core comprises:
a memory access processing unit, adapted to process a memory access instruction, and if data needs to be read from outside the given processor core, instruct a bus requesting unit of the given processor core to send a second read data request to the multi-core interconnection bus;
the bus requesting unit, adapted to send the second read data request to the multi-core interconnection bus;
a forwarding processing unit, adapted to receive the first read data request forwarded by the multi-core interconnection bus, and send the first read data request to a cache read/write unit of the given processor core; and
the cache read/write unit, adapted to access the cache when receiving the first read data request, and return the first request result to the forwarding processing unit, wherein;
the forwarding processing unit is further adapted to send the first request result to the multi-core interconnection bus; and
the bus requesting unit is further adapted to receive the valid data sent by the multi-core interconnection bus, and send the valid data to the memory access processing unit.

8. The multi-core processor according to claim 1, wherein the given request processing interface comprises:
a request processing unit, adapted to receive a second read data request sent by the given processor core, and send the second read data request to the request storage unit;
a request forwarding unit, adapted to send the first read data request forwarded by the request storage unit, to the given processor core, and send the first request result returned by the given processor core, to a corresponding result arbitration unit of the one of the plurality of request processing interfaces; and
a result arbitration unit, adapted to receive the second request result sent by the any other request processing interface, determine the valid data based on the first received request result and the second received request result, and send the valid data to the request processing unit, wherein
the request processing unit is further adapted to send the received valid data to the given processor core.

9. The multi-core processor according to claim 8, wherein when receiving the second request result returned by the memory, the request storage unit is further adapted to send the second request result to the result arbitration unit of the given request processing interface coupled to the given processor core; and the result arbitration unit is further adapted to:
when the valid data exists in the second request result sent by the any other request processing interface, send the valid data to the request processing unit; and
when no valid data exists in the first request result and the second request result sent by other request processing interfaces, send the valid data in the request result sent by the request storage unit, to the request processing unit.

10. The multi-core processor according to claim 9, wherein the result arbitration unit is further adapted to discard the other received second request results after sending the valid data to the request processing unit.

11. A system-on-chip, comprising the multi-core processor according to claim 1.

12. An intelligent device, comprising the system-on-chip according to claim 11.

13. An inter-core data forwarding method for a multi-core processor, wherein the multi-core processor comprises a plurality of processor cores and a multi-core interconnection bus, the multi-core interconnection bus comprises a request storage unit and a plurality of request processing interfaces, each request processing interface is coupled to a different processor core in the plurality of processor cores, and the method comprises:
sending, by a first processor core in the plurality of processor cores, a first read data request to a coupled first request processing interface;
sending, by the first request processing interface, the first read data request to the request storage unit, and forwarding, by the request storage unit, the first read data request to another request processing interface;
sending, by the another request processing interface, the first read data request to another processor core coupled to the another request processing interface, receiving a first request result that is returned by the another processor core by reading a cache of the another processor core, and sending the first request result to the first request processing interface and the request storage unit; and
determining, by the first request processing interface, valid data based on the received first request result, and sending the valid data to the first processor core, wherein when no valid data is determined in the first request result, sending, by the request storage unit, the first read data request to a memory coupled to the request storage unit.

14. The method according to claim 13, further comprising:
when no valid data exists in the first request results sent by the plurality of request processing interfaces, receiving, by the request storage unit, the first request result returned by the memory, and sending the first request result to the first request processing interface.

15. The method according to claim 13, wherein determining, by the first request processing interface, the valid data based on the received first request result, and sending the valid data to the first processor core comprises:
when the valid data exists in the first request result sent by the another request processing interface, sending the valid data to the first processor core; and
when no valid data exists in the first request results sent by the plurality of request processing interfaces, sending the valid data in the first request result sent by the request storage unit, to the first processor core.

16. The method according to claim 15, further comprising:
  after sending the valid data to the first processor core, discarding, by the first request processing interface, other received first request results.

17. The method according to claim 13, wherein:
  when receiving the first read data request sent by the first request processing interface, determining, by the request storage unit, whether an address of the first read data request is a shared address; and
  in response to a determination that the address of the first read data request is the shared address, forwarding, by the request storage unit, the first read data request to the another request processing interface; or
  in response to a determination that the address of the first read data request is not the shared address, sending, by the request storage unit, the first read data request to the memory coupled to the request storage unit.

18. The method according to claim 13, wherein when receiving the first read data request sent by the first request processing interface, accessing, by the request storage unit, a snoop filter, to determine a corresponding processor core having the valid data and forward the first read data request to a corresponding request processing interface coupled to the corresponding processor core having the valid data.

* * * * *